United States Patent
Krishnamurthy et al.

(10) Patent No.: US 11,569,939 B1
(45) Date of Patent: Jan. 31, 2023

(54) SYNCHRONIZING A HIGH-SPEED SIGNALING INTERCONNECT

(71) Applicant: NVIDIA Corporation, Santa Clara, CA (US)

(72) Inventors: Adithya Hrudhayan Krishnamurthy, Sunnyvale, CA (US); Ish Chadha, San Jose, CA (US)

(73) Assignee: NVIDIA Corporation, Santa Clara, CA (US)

(*) Notice: Subject to any disclaimer, the term of this patent is extended or adjusted under 35 U.S.C. 154(b) by 0 days.

(21) Appl. No.: 17/402,422

(22) Filed: Aug. 13, 2021

(51) Int. Cl.
*H04L 1/00* (2006.01)
*H04L 1/16* (2006.01)

(52) U.S. Cl.
CPC .......... *H04L 1/0083* (2013.01); *H04L 1/009* (2013.01); *H04L 1/0061* (2013.01); *H04L 1/1607* (2013.01)

(58) Field of Classification Search
CPC ..... H04L 1/009; H04L 1/0061; H04L 1/0083; H04L 1/1607
See application file for complete search history.

(56) References Cited

U.S. PATENT DOCUMENTS

| | | | | |
|---|---|---|---|---|
| 5,712,624 A | * | 1/1998 | Ayerst | H04W 88/026 340/7.22 |
| 2017/0187767 A1 | * | 6/2017 | Wang | H04L 45/24 |

FOREIGN PATENT DOCUMENTS

WO    WO-2011105096 A1 *  9/2011 ........... H04N 21/235

* cited by examiner

*Primary Examiner* — Shelly A Chase
(74) *Attorney, Agent, or Firm* — Lowenstein Sandler LLP (57) ABSTRACT

A system includes a first device and a second device coupled to a link. The first device is to transmit one or more request frames for synchronization of a data layer, each request frame including a quantity of bits and an error code. The second device is to receive a first set of bits corresponding to the quantity of bits in each request frame. The second device is to perform an error decode operation on the first set of bits using a first portion of the first set of bits and determine the first set of bits correspond to a frame boundary of the one more request frames responsive to a success of the error decode operation. The second device is to transmit an acknowledgement of the synchronization of the data layer based on determining the first set of bits corresponds to the frame boundary.

20 Claims, 5 Drawing Sheets

SYNCHRONIZING A HIGH-SPEED SIGNALING INTERCONNECT

TECHNICAL FIELD

At least one embodiment pertains to processing resources used to perform and facilitate high-speed communications. For example, at least one embodiment pertains to technology for synchronizing a data-link layer for a local transmitter and a remote receiver pair in a ground-referenced signaling (GRS) interconnect.

BACKGROUND

Communication systems transmit signals from a transmitter to a receiver via a communication channel or medium (e.g., cables, printed circuit boards, links, wirelessly, etc.) Communicating from the transmitter to the receiver results in the need for the receiver to be synchronous with the transmitter as data may otherwise be corrupted. For example, a local transmitter may need to be synchronous with a remote receiver when communicating chip to chip (C2C). Some communication systems may attempt synchronization between the transmitter and the receiver by scanning a bit stream communicated for special symbols or fields or use hysteresis filters. For example, a system may attempt to synchronize the transmitter and receiver by transmitting packets from the transmitter that include bit/byte/character stuffing and have the receiver scan for keywords or the additional bit/byte/characters in the bit stream to demarcate the boundaries of the packets. Such conventional methods may be unreliable or cause a receiver to falsely determine synchronization between the transmitter and the receiver.

BRIEF DESCRIPTION OF DRAWINGS

Various embodiments in accordance with the present disclosure will be described with reference to the drawings, in which.

DETAILED DESCRIPTION

As described above, scanning the bit stream for special filters or utilizing hysteresis filters may be unreliable to synchronize a local transmitter and a remote receiver. Without proper synchronization, a receiver may be unable to perform an error decode operation on data received. For example, a communication system may include a first device (e.g., a first chip) and a second device (e.g., a second chip) and communicate data via a ground-referenced signaling (GRS) link—e.g., the communication system may be a chip-to-chip (C2C) interconnect. The data may be communicated from a transmitter of the first device to a receiver of the second device across the link in frames of fixed lengths. For example, each frame may include a same quantity of bits and transmit portions of the data. In some examples, a physical layer (PL) of GRS C2C interconnect may train (e.g., synchronize) before the link is released to a data-link layer (DL). In such examples, the transition from the PL to the DL may occur at any time. Additionally, the link may be driven to either a first logic state (e.g., logic '0') or a second logic state (e.g., logic '1') constantly during the transition from the PL to the DL based on the GRS link architecture. Accordingly, without proper synchronization, the receiver may process data transmitted during the transition from the PL to the DL or process data at an arbitrary point of a data frame—e.g., process a portion of a first data frame and a second data frame based on incorrectly determining a start or end of a data frame. This may cause the receiver to be unable to perform data detection on the data received and cause the system to have a high bit-error-rate (BER).

Advantageously, aspects of the present disclosure are related to a method for determining frame boundaries (e.g., a beginning or end of a given frame) demarcated by a transmitter at a remote receiver before transmitting data from the transmitter to the receiver. According to embodiments, the transmitter may transmit request frames to the receiver to begin a synchronization process. The receiver may perform an error decode operation on a set of received bits corresponding to a frame size of the request frame using an error code encoded in each frame transmitted by the transmitter—e.g., the receiver may perform a cyclic-redundancy check (CRC) on each frame received. The receiver may determine the frame boundaries if a request frame passes the CRC check. In such examples, the receiver may transmit an acknowledgment determining the frame boundaries, and the transmitter may begin to send data based on the acknowledgment.

If the request frame fails the CRC check, the receiver may refrain (e.g., skip) from performing a CRC on a second set of bits (e.g., a quantity of bits having a size smaller than the frame size or a quantity of bits received during one clock cycle) received subsequent to the first set of bits, and perform a CRC on a third set of bits received subsequent to the second set of bits, where the third set of bits corresponding to the frame size. That is, the receiver may skip a CRC on a predetermined size of bits (e.g., on a flit or on a quantity of bits received during one clock cycle) subsequent to determining the first set of bits corresponding to the frame size fails the CRC and resume the error decode operation on the subsequent third set of bits received that correspond to the frame size. The receiver may continue this process (e.g., skipping a quantity of bits corresponding to the size of the quantity of bits received in one clock cycle and performing the error decode operation on the subsequent bits that correspond to the frame size) until a received set of bits corresponding to the frame size passes the CRC. Accordingly, the receiver may guarantee a frame lock as the transmitter continuously transmits request frames until the receiver determines the frame boundaries. Additionally, in most examples, the receiver will determine the frame boundary within an "N" quantity corresponding to the size of the subset of bits. Embodiments of the present application allow for a more reliable method to synchronize between the transmitter and receiver and reduce the BER of the system.

Figure 1:
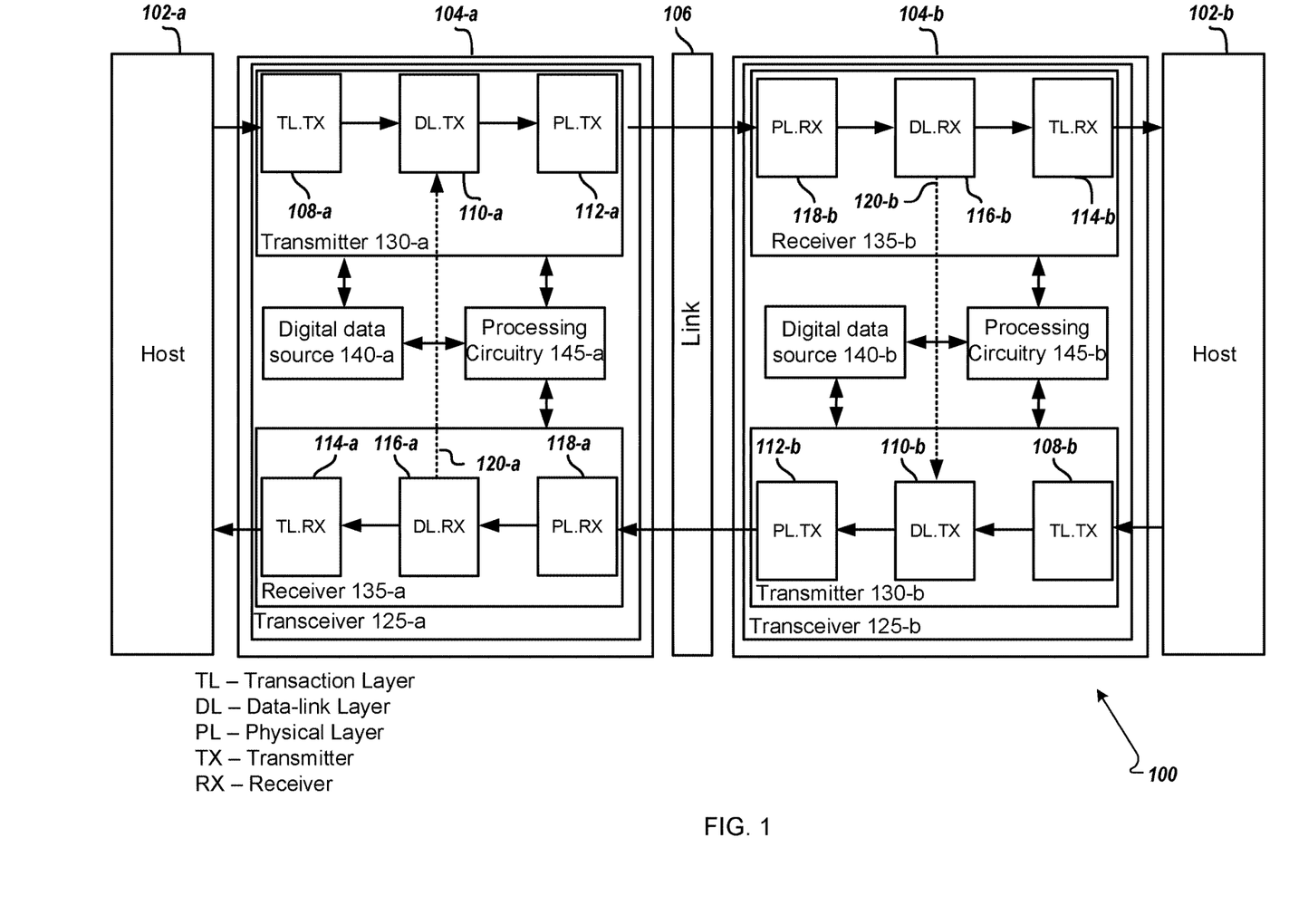
FIG. 1 is an example communication system employing a method to synchronize a receiver and transmitter, in accordance with at least some embodiments.

FIG. 1 illustrates an example communication system 100 according to at least one example embodiment. The system 100 includes a host 102-*a*, a host 102-*b*, a first device 104-*a*, and a second device 104-*b*. The system 100 also includes a link 106 coupling the first device 104-*a* and the second device 104-*b*. Each device 104 may include a transceiver 125 that includes a transmitter 130, a receiver 135, a digital data source 140, and processing circuitry 145. Each transmitter 130 may include a transaction layer (TL) 108, a data layer (DL) 110, a physical layer (PL) 112, and each receiver 135 may include TL 114, a DL 116, and a PL 118.

In at least one example, hosts 102 or devices 104 may correspond to one or more of a Personal Computer (PC), a laptop, a tablet, a smartphone, a server, a collection of servers, or the like. In some examples, the hosts 102 may correspond to any appropriate type of device that communicates with other devices and is also connected to a common link 106. In some examples, hosts 102 may transmit commands or data to devices 104. In such examples, devices 104 may communicate data with each other based on commands or data received by the hosts 102. As another specific but non-limiting example, the hosts 102 and devices 104 may correspond to servers offering information resources, services and/or applications to user devices, client devices, or other hosts in the system 100.

In at least one example embodiment, first device 104-*a* and second device 104-*b* may be examples of chips—e.g., system 100 may be an example of a multi-chip module or a chip-to-chip (C2C) interconnect. In such examples, the devices 104 may be single chips or stacks of chips. In some examples, devices 104 may include a graphics processing unit (GPU), a switch (e.g., a high-speed network switch), a network adapter, a central processing unit (CPU), etc., to execute commands or functions received from the hosts 102. Each device 104 may include a transceiver 125 for sending and receiving signals, for example, data signals. The data signals may be digital or optical signals modulated with data or other suitable signal for carrying data. Each transceiver 125 may include a receiver 135 and a transmitter 130. The transmitter 130 includes suitable software and/or hardware for receiving digital data from the digital data source 140 and outputting data signals according to the digital data for transmission over the link 106 to a receiver 135 of device 104-*b*. The receiver 104 of device 110 and device 112 may include suitable hardware and/or software for receiving signals, for example, data signals from the link 106.

In an embodiment, devices 104 may communicate bi-directionally—e.g., from host 102-*a* to host 102-*b* or from host 102-*b* to host 102-*a*. In some examples, each receiver 135 or transmitter 130 of devices 104 may operate independently and/or simultaneously. For example, receiver 135-*a* of first device 104-*a* may receive data from transmitter 130-*b* of second device 104-*b* simultaneous with transmitter 130-*a* of first device 104-*a* transmitting data to receiver 135-*b* of second device 104-*b*.

Each transmitter 130 and receiver 135 in devices 104 may include a transaction layer (TL). In some examples, the TL 108 of the transmitter 130 may be configured to request a transaction—e.g., request the transmission of data. For example, the TL 108 of the transmitter 130 may communicate functions or assemble data packets for other components of the devices 104. In some examples, the TL 108 of the transmitter 130 may generate a transaction layer packet (TLP) that may be transmitted to the DL 110 for further processing. In some examples, each receiver 135 in devices 104 may also include a transaction layer 114. In some examples, the TL 114 of the receiver 135 may be configured to complete a transaction—e.g., complete the transmission of data. For example, the TL 114 of the receiver 135 may receive functions from or disassemble packets received from other components of the receiver of each device 104. In some embodiments, the TL 114 of the receiver 135 may verify an incoming TLP packet to ensure the packet received is valid—e.g., without errors.

Each transmitter 130 and receiver 135 in devices 104 may also include a data layer. In some examples, the DL 110 and DL 116 may be configured to ensure data being sent across the link 106 is correct and without errors. For example, the DL 110 of the transmitter 130 may encode a respective frame or packet transmitted with an error code—e.g., a CRC value. The DL 116 of the receiver 125 may generate an error code based on the received frame and decode the CRC embedded in the frame to compare whether the generated error code matches the transmitted CRC. In some examples, the DL 116 performs the error decode operation to see if the data received is correct and without errors. In some examples, the DL 110 of the transmitter 130 may be configured to add a sequence number as a header to each frame or packet transmitted, and the DL 116 of the receiver 135 may be configured to check the sequence number as well. In some examples, the DL 110 of the transmitter 130 and DL 116 of the receiver 135 may include or be coupled with controllers or control flow units to perform the error decode operations on packets or frames received—e.g., the processing circuitry 145.

Additionally, each transmitter 130 and receiver 135 in devices 104 may include a physical layer (PL). In some examples, the PL 112 and PL 118 may be configured to transmit and receive data across the link 106. For example, the PL 112 and PL 118 may include input/output (I/O) buffers, parallel-to-serial and serial-to-parallel converters, impedance matching circuitry, logic circuitry, etc., to transmit and receive data packets or frames across the link 106.

Each transceiver 125 may include a digital data source 140 and processing circuitry 145 that controls the transceiver 125. The digital data generator 140 may include suitable hardware and/or software for outputting data in a digital format (e.g., in binary code and/or thermometer code). The digital data output by the digital data source 140 may be retrieved from memory (not illustrated) or generated according to input (e.g., user input).

The processing circuitry 145 may comprise software, hardware, or a combination thereof. For example, the processing circuitry 145 may include a memory including executable instructions and a processor (e.g., a microprocessor) that executes the instructions on the memory. The memory may correspond to any suitable type of memory device or collection of memory devices configured to store instructions. Non-limiting examples of suitable memory devices that may be used include Flash memory, Random Access Memory (RAM), Read Only Memory (ROM), variants thereof, combinations thereof, or the like. In some embodiments, the memory and processor may be integrated into a common device (e.g., a microprocessor may include integrated memory). Additionally or alternatively, the processing circuitry 145 may comprise hardware, such as an application specific integrated circuit (ASIC). Other non-limiting examples of the processing circuitry 132 include an Integrated Circuit (IC) chip, a Central Processing Unit (CPU), a General Processing Unit (GPU), a microprocessor, a Field Programmable Gate Array (FPGA), a collection of logic gates or transistors, resistors, capacitors, inductors, diodes, or the like. Some or all of the processing circuitry 145 may be provided on a Printed Circuit Board (PCB) or collection of PCBs. It should be appreciated that any appropriate type of electrical component or collection of electrical components may be suitable for inclusion in the processing circuitry 145. The processing circuitry 145 may send and/or receive signals to and/or from other elements of the transceiver 125 to control overall operation of the transceiver 125.

The transceiver 125 or selected elements of the transceiver 125 may take the form of a pluggable card or controller for the device 104. For example, the transceiver 125 or selected elements of the transceiver 125 may be implemented on a network interface card (NIC).

The link 106 may be an example of a communication network that may be used to connect the devices 104 such as an Internet Protocol (IP) network, an Ethernet network, an InfiniBand (IB) network, a Fibre Channel network, the Internet, a cellular communication network, a wireless communication network, combinations thereof (e.g., Fibre Channel over Ethernet), variants thereof, and/or the like. In one specific, but non-limiting example, the link 106 is a network that enables data transmission between the devices 104 using data signals (e.g., digital, optical, wireless signals).

In an embodiment, link 106 may be configured to transmit requests, data, functions, commands, etc. between the first device 104-a and the second device 104-b. In one example, link 106 may be cables, printed circuit boards, links, wireless, etc. In at least one embodiment, the link 106 may be an example of a ground-referenced signaling (GRS) interconnect. In such examples, the link 106 may include RC-dominated channels and LC transmission lines. Additionally, the GRS interconnect may be an on-chip link, a link across a substrate (e.g., organic package) or link signaling over a printed circuit board (PCB). In some examples, GRS may use a ground network as a signal reference voltage—e.g., ground may be the return signaling. Although not explicitly shown, it should be appreciated that hosts 102 and devices 104 may include other processing devices, storage devices, and/or communication interfaces generally associated with computing tasks, such as sending and receiving data.

In some examples, based on GRS architecture, the link 106 may be configured to be driven to a logic state '1' or a logic state '0' by either transmitter of the devices 104. In such examples, determining a transition between the PL layer to the DL layer may be difficult—e.g., the link 106 may transition from transmitting PL layer information to DL layer information arbitrarily. Additionally, based on the link 106 transmitting high-speed data, there may be a high BER and possibility of a link 106 error while transmitting data. Accordingly, at least one embodiment describes a method to synchronize the DL of a transmitter 130-a of the first device 104-a with the DL of a receiver 135-b of the second device 104-b before transmitting data. As described above, the link 106 supports bi-directional communication. In such embodiments, the method to synchronize the DL may also be utilized by the transmitter 130-b of the second device 104-b and the receiver 135-a of the first device 104-a independently and/or simultaneously.

Figure 2:
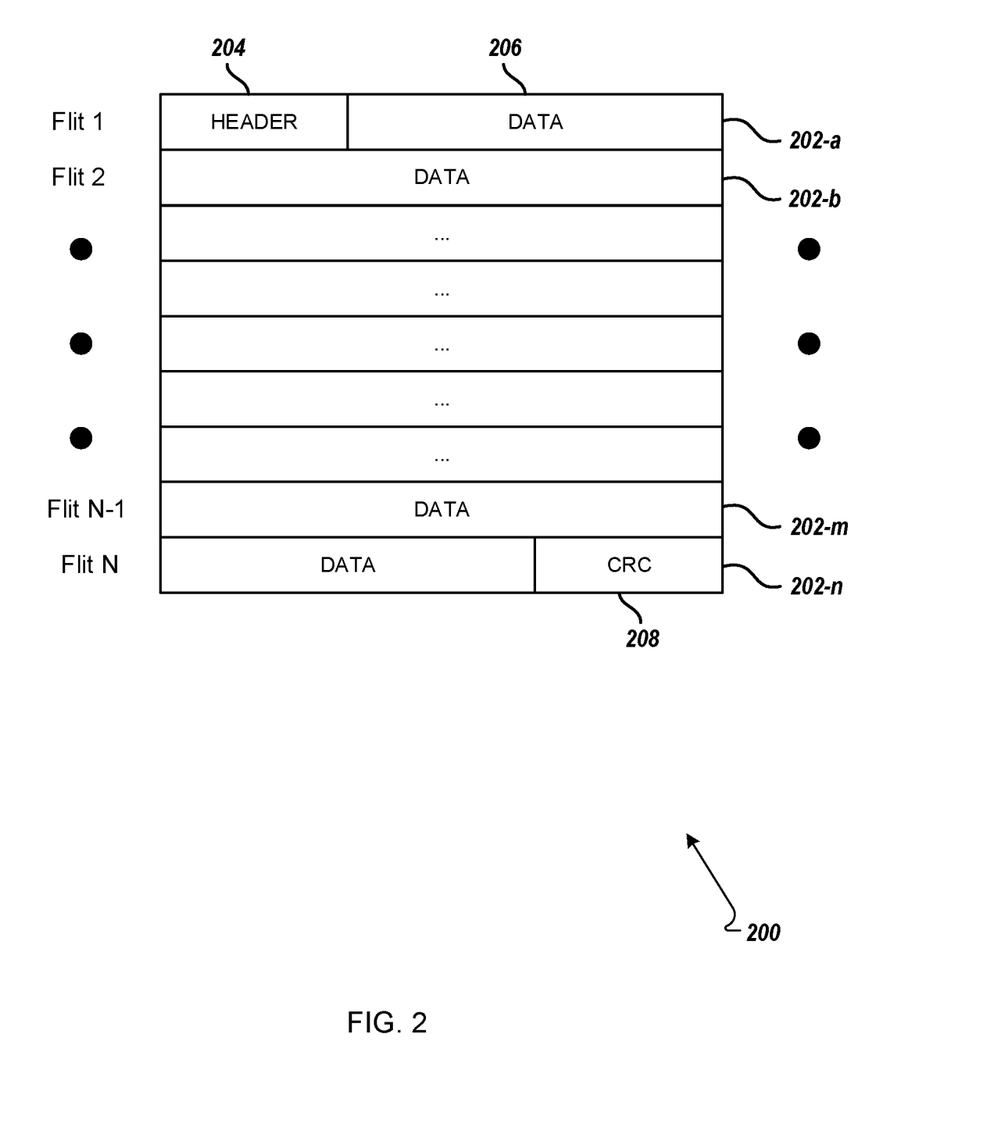
FIG. 2 illustrates an example of a frame communicated in a communication system, in accordance with at least some embodiments.

In some embodiments, the system 100 may synchronize the PL of the first device 104-a and the second device 104-b before synchronizing the DL of the first device 104-a and the second device 104-b. After synchronizing the PL but before transmitting data, the transmitter 130-a of the first device 104-a may transmit request frames as illustrated by FIG. 2. In some embodiments, the request frames may be sent after a reset of the receiver 135, after a restart of the receiver 135, or any other arbitrary restart determined by a user or other code utilized by the receiver 135. In some examples, the request frame may otherwise be known as a frame including a request or simply as a request for synchronization.

As illustrated in FIG. 2, a frame 200 transmitted by the transmitter may include "N" flits 202. For example, a given frame 200 may include ten (10) flits 202. In some examples, each flit 202 may include a same quantity of bits—e.g., each flit 202 is "X" bits wide. For example, each flit 202 may be 128 bits wide. In some examples, the DL 110 of the transmitter 130 may transmit one (1) flit per each clock cycle. Accordingly, each frame may be transmitted in "N" clock cycles based on the "N" number of flits 202. Additionally, each frame 200 may include an error code CRC 208. The DL 110 is configured to generate the CRC 208 for the entire frame. In such embodiments, the DL 116 of the receiver 135 is configured to perform an error decode operation across the "N" flits 202 for each frame 200—e.g., the receiver 135 is configured to perform one error decode operation after receiving "N" flits 202 corresponding to a size or width of the frame 200. In that, the error decode operation is performed at a frame granularity. Each frame 200 may also include a header 204.

In some examples, frame 200 may be a request frame transmitted by the transmitter 130-a to the receiver 135-b to initiate a synchronization of the DL between the first device 104-a and the second device 104-b. For example, the transmitter 130-a may transmit the request frame 200 from DL 110-a to the link 106 to initiate the synchronization. Each request frame 200 transmitted by the transmitter 130-a may include a header 204 that includes a sequence, information, identifiers, etc., that indicates the frame 200 is a request frame—e.g., a request to synchronize the DL 110-a with DL 116-b of the receiver 135-b in the second device 104-b. In some embodiments, the request frame 200 may also include data—e.g., training data or data otherwise utilized in the synchronization process. Each request frame 200 also includes the CRC 208. The receiver 135-b of the second device 104-b may utilize the CRC 208 to determine if an "N" quantity of flits 202 received match or align with a given request frame 200—e.g., if the "N" quantity of flits 202 passes or fails the CRC error decode operation. It should be noted each CRC of the request frame 200 is the same—e.g., each request frame 200 transmitted by the transmitter 130-a has at least some portion common to another request frame 200. For example, the transmitter 130-a could transmit a first request frame 200 having first data and a first error code and a second request frame having second data and a second error code, where the first error code and the second error code are the same. Additional details regarding the request frame 200, the error decode operation, and the synchronization process are described with reference to FIGS. 3 and 4.

In some embodiments, if the second device 104-b determines a received "N" number of flits 202 align with a request frame 200, the second device 104-b may transmit an acknowledgment from DL 110-b to DL 116-a. That is, a control flow unit (a control finite state machine (FSM), controller, etc.) may determine the DL 116-b is synchronized with DL 110-a and transmit a message 120-b (via the processing circuitry 145-b) to transmitter 130-b of the second device 104-b. The frame 200 transmitted by the DL 110-b may include the acknowledgment. For example, the acknowledgment may not be a unique frame 200 but rather is embedded (or identified in) the frame 200—e.g., the header 204 may include a symbol, sequence, or identifier of the acknowledgment. In response to the acknowledgment, the first device 104-a may transmit a synchronization done frame 200 (e.g., a frame 200 including a symbol, sequence, or identifier of the synchronization being done) to the second device 104-*b* before transmitting the data of the host 102-*a*—e.g., before transmitting data frames 200.

Figure 3:
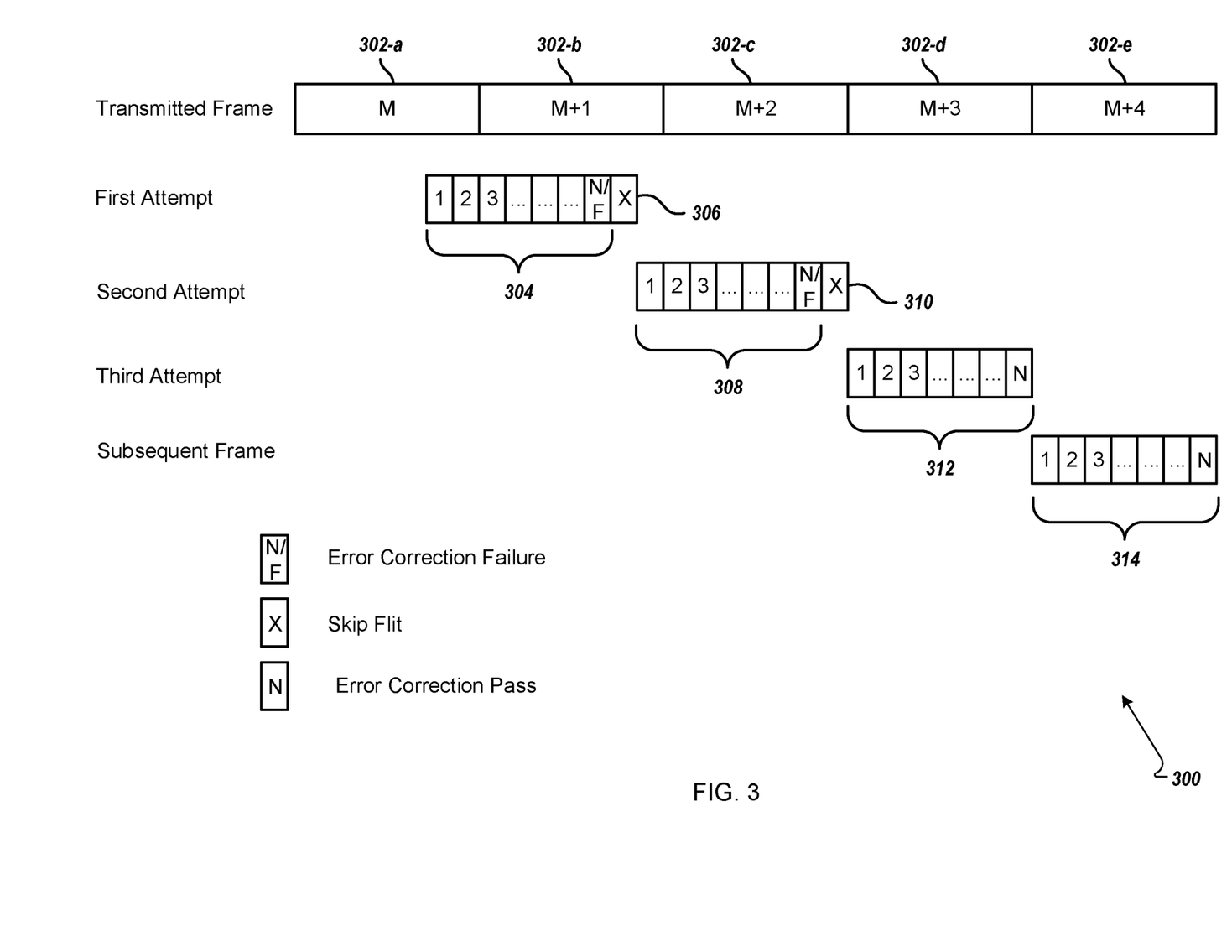
FIG. 3 is a diagram of a method to synchronize a receiver and transmitter, in accordance with at least some embodiments.

FIG. 3 illustrates a diagram 300 of a method to synchronize a local transmitter and a remote receiver. For example, diagram 300 illustrates a method to utilize an error decode operation at the receiver to determine frame boundaries utilized by the transmitter. The method illustrated by diagram 300 can be performed by processing logic comprising hardware, software, firmware, or any combination thereof. In at least one embodiment, the method illustrated by diagram 300 is performed by a DL 116-*b* of a receiver 135-*b* in the second device 104-*b* or a DL 116-*a* of a receiver 135-*a* in the first device 104-*a* of FIG. 1. In some embodiments, the receiver 135 may receive the data, flits 202, bits, frames 200, etc. from a DL 110-*a* or DL 110-*b* of a transmitter 130-*a* of the first device 104-*a* or the transmitter 130-*b* of the second device 104-*b*, respectively, as described with reference to FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other diagrams illustrating a method to synchronize are possible.

As described above, to initiate a synchronization of the DL between the transmitter of the first device 104-*a* and the receiver of the second device 104-*b* (e.g., between DL 110-*a* and DL 116-*b*), the transmitter may transmit request frames. For example, DL 110-*a* may first transmit a request frame "M" 302-*a* and subsequent request frames "M+1" 302-*b*, "M+2" 302-*c*, "M+3" 302-*d*, and "M+4" 302-*e*. Based on link 106 delays, errors, and arbitrary transitions, DL 116-*b* may begin receiving flits (e.g., a quantity of bits) that are asynchronous with the frame "M" 302-*a*. That is, DL 116-*b* may receive "N" flits 304 that corresponds to the request frame size or width, but that includes portions of the transmitted frame "M" 302-*a* and frame "M+1" 302-*b*. In such embodiments, DL 116-*b* may determine an error decode operation on "N" flits 304 fails. That is, DL 116-*b* may perform an error decode operation by generating an error code for the first "N" flits 304 received that corresponds to a frame size and determine the CRC embedded within flits 304 does not match the generated error code. Accordingly, the DL 116 may determine the flits 304 do not correspond to a frame boundary based on the failure of the error decode operation. In such embodiments, DL 116-*b* may skip or otherwise refrain from performing any error decode operation on the next flit 306 received—e.g., DL 116-*b* may ignore flit 306 and not include flit 306 as part of receiving the next "N" flits or being a part of any frames decoded by DL 116-*b*. In some examples, the flit 306 may also be referred to as a set of bits having a size less than a frame size, a set of bits having a predetermined size, or a subset of bits. Alternatively, skipping flit 306 may be referred to as skipping data or a quantity of bits received during a clock cycle subsequent to receiving the "N" flits 304.

After skipping flit 306, DL 116-*b* may perform the error decode operation on the subsequent "N" flits 308 received. In the example illustrated in diagram 300, the flits 308 are also asynchronous with a transmitted frame 302. That is, flits 308 include portions of frame "M+1" 302-*b* and "M+2" 302-*c*. Accordingly, when DL 116-*b* performs the decode operation on flits 308, DL 116-*b* may determine the error code generated for flits 308 does not match the CRC embedded within flits 308. As such, the DL 116-*b* may determine the flits 308 do not correspond to a frame boundary based on the error decode operation. Accordingly, DL 116-*b* may skip or otherwise refrain from performing an error decode operation on flit 310—e.g., exclude flit 310 from a next quantity of "N" flits received or refrain from generating an error code considering flit 310.

After skipping flit 310, DL 116-*b* may perform the error decode operation on the subsequent "N" flits 312 received. In the example illustrated in diagram 300, the flits 312 are synchronized with a transmitted frame 302. That is, flits 312 are synchronized with (e.g., align with) transmitted frame "M+3" 302-*d*. Accordingly, when DL 116-*b* performs the decode operation on flits 312, DL 116-*b* may determine that the CRC embedded within flits 312 corresponds to an error code generated for "N" flits 312. Accordingly, the DL 116-*b* may determine the received "N" flits 312 correspond to a frame boundary based on the error decode operation. In the example illustrated in diagram 300, the DL 116-*b* may receive an additional set of flits 314 and perform the error decode operation on flits 314 to ensure the frame boundary was correct. That is, the DL 116-*b* may refrain from skipping any flits when the frame boundary is determined.

After determining the frame boundary, DL 116-*b* may generate an acknowledgment and send a message 116-*b* to the DL 110-*b* of the transmitter of the second device 104-*b*. Accordingly, DL 110-*b* may transmit a frame 200 with the acknowledgment as described with reference to FIG. 2. Subsequently, in some embodiments, the DL 116-*a* may transmit a message indicating the acknowledgment received from the second device 104-*a* to DL 110-*a* and the first device 104-*a* may transmit a synchronization done frame followed by the data based on the synchronization between DL 110-*a* and DL 116-*b* of the first device 104-*a* and the second device 104-*b*—e.g., the first device 104-*a* and second device 104-*b* may execute a handshake and transmit data based on the handshake.

It is noted, diagram 300 illustrates one example and other examples are possible. In some embodiments, DL 116-*b* may perform more or less error decode operations than indicated in diagram 300 based on when flits 304 are received. For example, flits 304 may be received synchronously with frame "M" 302-*a*, and DL 116-*b* may determine the frame boundary after one (1) error decode operation. In other examples, flits 304 may be received one (1) flit offset from frame "M" 302-*a*. In such examples, the DL 116-*b* may perform "N" error decode operations—e.g., based on "N" flits in a frame. That is, in most examples the DL 116-*b* may determine the frame boundary within 1 to "N" frames received, where "N" is the quantity of flits in each frame. In some embodiments, based on random link errors, the DL 116-*b* may determine the frame boundary after receiving "N" frames—e.g., within two (2) times "N" frames. Additionally, as each frame transmitted includes an embedded CRC, a likelihood DL 116-*a* accepts corrupted or error-ridden data is reduced—e.g., each frame is protected by CRC.

As described above, the system 100 is bi-directional. Accordingly, DL 116-*b* may be synchronized with DL 110-*a* independently and/or simultaneous with DL 116-*a* being synchronized with DL 110-*b*. The synchronization of DL 116-*a* may be done by a method as described herein with reference to FIG. 3.

Figure 4:
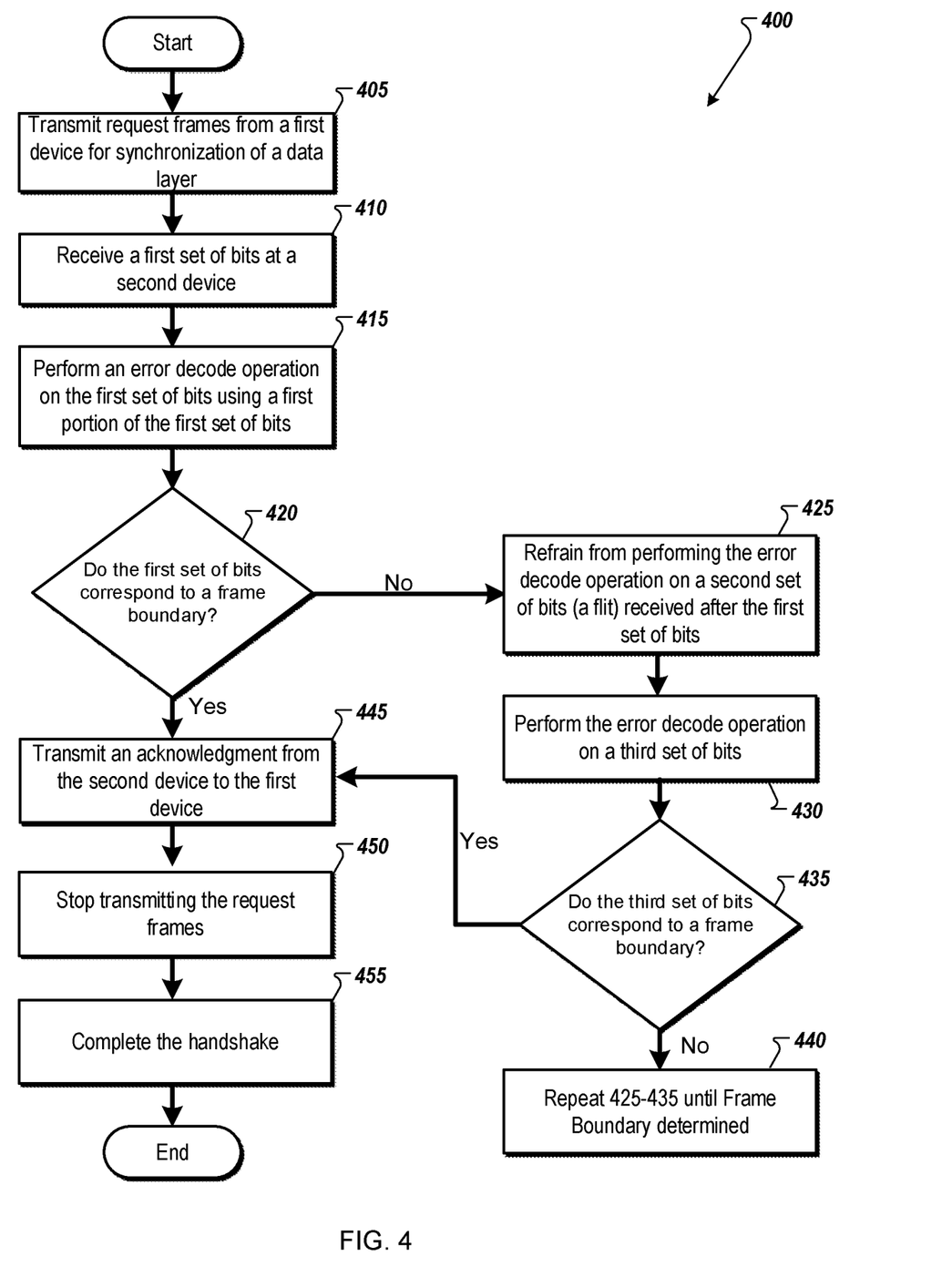
FIG. 4 is a flow diagram of a for synchronizing a high-speed singling interconnect, in accordance with at least some embodiments.

FIG. 4 illustrates a flow diagram of a method 400 for synchronizing a high-speed singling interconnect—e.g., synchronize a local transmitter and a remote receiver. For example, method 400 illustrates utilizing an error decode operation at the receiver to determine frame boundaries utilized by the transmitter. The method 400 can be performed by processing logic comprising hardware, software, firmware, or any combination thereof. In at least one embodiment, the method 400 is performed by a DL 116-b of a receiver in the second device 104-b or a DL 116-a of a receiver in the first device 104-a of FIG. 1. In some embodiments, the receiver may receive the data, flits 202, bits, frames 200, etc. from a DL 110-a or DL 110-b of a transmitter of the first device 104-a or the second device 104-b, respectively, as described with reference to FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other diagrams illustrating a method to synchronize are possible.

At operation 405, a transmitter (e.g., DL 110-a) in a first device (e.g., first device 104-a of FIG. 1) transmits one or more request frames for synchronization of a data layer to a receiver (e.g., DL 116-b) of a second device (e.g., second device 104-b). In an embodiment, the request frame is transmitted via a link (e.g., link 106) coupling the first device and the second device. In some examples, the link is a GRS interconnect. In an embodiment, the request frame includes a quantity of bits (e.g., flits) and an error code. In an embodiment, the transmitter transmits a first request frame with first data and a first error code and a second request frame with second data and a second error code, the first error code the same as the second error code.

At operation 410, the receiver of the second device receives a first set of bits. In an embodiment, the first set of bits corresponds to a quantity of bits in each request frame. That is, the receiver receives a quantity of bits having a width or size equal to each request frame.

At operation 415, the receiver performs an error decode operation on the first set of bits using a portion of the first set of bits. In an embodiment, the portion of the first set of bits is the error code included in each request frame transmitted by the receiver. In an embodiment, the receiver performs a CRC operation on the first set of bits as each request frame includes a CRC value that is checked during the error decode operation. In an embodiment, the receiver generates an error code based on the first set of bits received. In such an embodiment, the receiver compares the generated error code with the embedded CRC code in the first set of bits.

At operation 420, the receiver determines whether the first set of bits corresponds to a frame boundary. In an embodiment, the receiver determines the first set of bits do not correspond to a frame boundary based on a failure of the error decode operation at operation 415—e.g., based on the generated error code not matching the embedded CRC code in the first set of bits. In such an embodiment, the receiver proceeds to operation 425. In an embodiment, the receiver determines the first set of bits do correspond to a frame boundary based on a success of the error decode operation at operation 415. In such an embodiment, the receiver proceeds to operation 445.

At operation 425, the receiver refrains from performing the error decode operation on a second set of bits (e.g., a flit, a set of bits having a quantity less than a frame size, or a quantity of bits received during one clock cycle of the receiver) received subsequent to the first set of bits. In an embodiment, the receiver ignores the second set of bits and does not consider the second set of bits as part of any frame for the purpose of the error decode operation. That is, the receiver performs an error decode operation on a quantity of bits received corresponding to the frame size, but does not consider the second set of bits as part of the quantity of bits that will be subject to the error decode operation—e.g., the receiver will not generate an error code based the second set of bits.

At operation 430, the receiver may receive a third set of bits from the transmitter and perform an error decode operation on the third set of bits. In an embodiment, the third set of bits is received subsequent to the second set of bits. In an embodiment, the third set of bits have a quantity of bits corresponding to the frame size/width. In some examples, to perform the error decode operation, the receiver may generate an error code for the third set of bits received and compare the generated error code with the CRC code embedded in the third set of bits.

At 435, the receiver may determine whether the third set of bits correspond to a frame boundary. In an embodiment, the receiver determines the third set of bits do not correspond to a frame boundary based on a failure of the error decode operation at operation 430—e.g., based on the generated error code for the third set of bits not matching the embedded CRC code in the third set of bits. In such an embodiment, the receiver proceeds to operation 440. In an embodiment, the receiver determines the third set of bits do correspond to a frame boundary based on a success of the error decode operation at operation 430—e.g., based on the generated error code for the third set of bits matching the embedded CRC code in the third set of bits. In such an embodiment, the receiver proceeds to operation 445.

At operation 440, the receiver may repeat the operations 425-435 until a frame boundary is found. In an embodiment, the receiver may skip a quantity of bits received having a size/width equal to the second set of bits (e.g., skip a quantity of bits received during a clock cycle) each time an error decode operation is unsuccessful. As described with reference to FIG. 3, by skipping the bits received in a clock cycle, the receiver will eventually determine the frame boundaries—e.g., within an "N" quantity of frames based on the size of the first quantity of bits. In such embodiments, the receiver may continue to alternate between performing the error decode operation and skipping bits received in a clock cycle following a failed error decode operation until the frame boundary is determined—e.g., until an error code generated for a quantity of bits corresponding to the frame size matches the CRC code embedded in the respective request frame. Accordingly, the receiver may proceed to operation 445 after the frame boundary is determined.

At operation 445, the second device transmits an acknowledgment of the synchronization (e.g., of determining the frame boundary) to the first. In an embodiment, a transmitter (e.g., DL 110-b) of the second device transmits the acknowledgment to a receiver (e.g., DL 116-a) of the first device. In an embodiment, the second device generates the acknowledgment and communicates it from the receiver to the transmitter of the second device.

At operation 450, the first device refrains from transmitting additional request frames based on receiving the acknowledgment. In an embodiment, the first device communicates the acknowledgment from the receiver to the transmitter of the first device.

At operation 455, a handshake between the first device and the second device is completed. In an embodiment, the transmitter of the first device transmits a synchronization done frame to the receiver of the second device based on receiving the acknowledgment. In an embodiment, the first device transmits data to the second device following the completion of the handshake. In an embodiment, a synchronization following the methods described herein is independently/simultaneously between the transmitter of the second device and the receiver of the first device.

Figure 5:
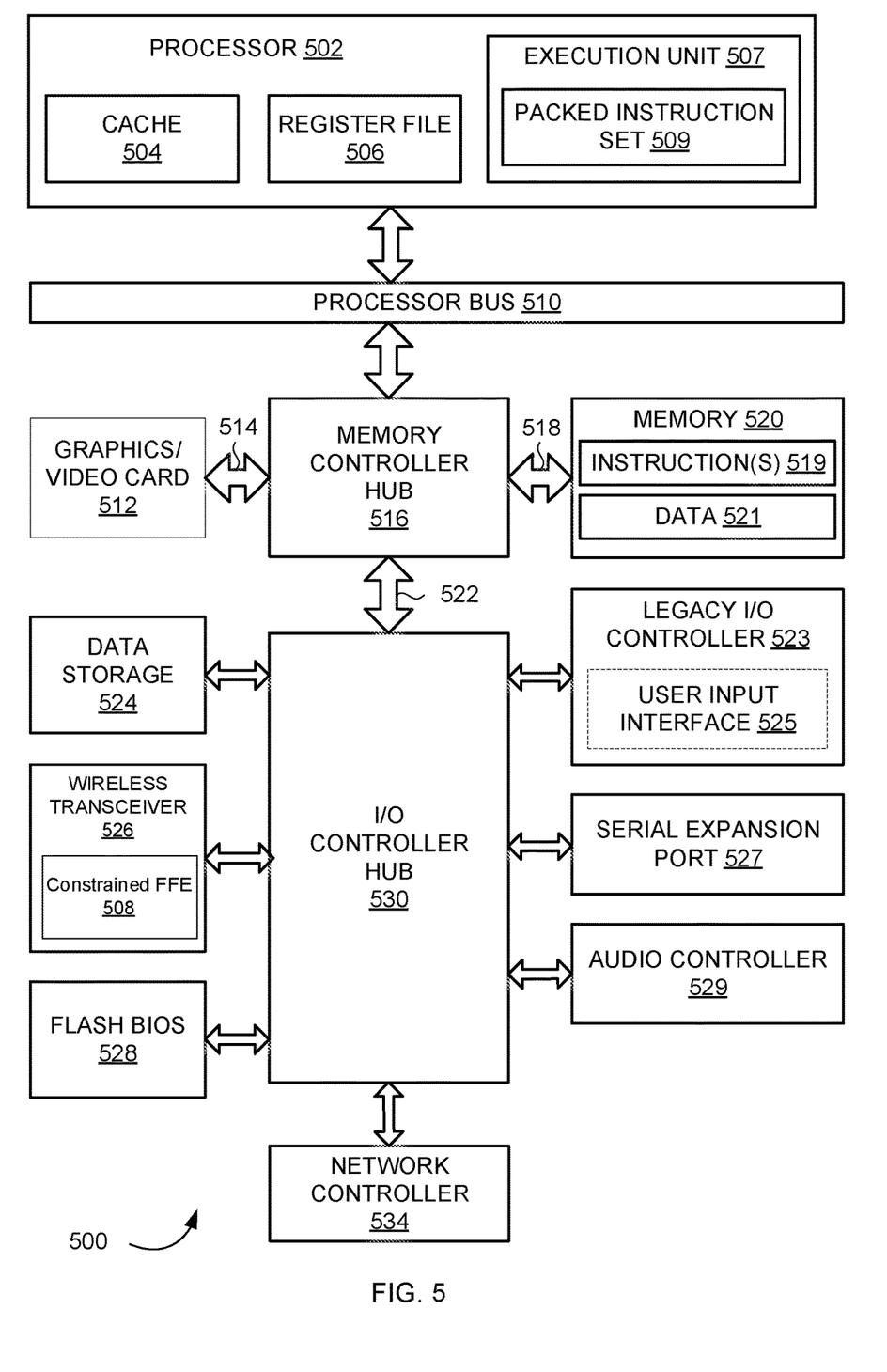
FIG. 5 illustrates an example computer system including a wireless transceiver including a chip to chip interconnect, in accordance with at least some embodiments.

FIG. 5 illustrates a computer system 500, in accordance with at least one embodiment. In at least one embodiment, computer system 500 may be a system with interconnected devices and components, an SOC, or some combination. In at least one embodiment, computer system 500 is formed with a processor 502 that may include execution units to execute an instruction. In at least one embodiment, computer system 500 may include, without limitation, a component, such as processor 502 to employ execution units including logic to perform algorithms for processing data. In at least one embodiment, computer system 500 may include processors, such as PENTIUM® Processor family, Xeon™, Itanium®, XScale™ and/or StrongARM™, Intel® Core™, or Intel® Nervana™ microprocessors available from Intel Corporation of Santa Clara, Calif., although other systems (including PCs having other microprocessors, engineering workstations, set-top boxes and like) may also be used. In at least one embodiment, computer system 500 may execute a version of WINDOWS' operating system available from Microsoft Corporation of Redmond, Wash., although other operating systems (UNIX and Linux for example), embedded software, and/or graphical user interfaces, may also be used.

In at least one embodiment, computer system 500 may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor (DSP), an SoC, network computers ("NetPCs"), set-top boxes, network hubs, wide area network ("WAN") switches, or any other system that may perform one or more instructions. In an embodiment, computer system 500 may be used in devices such as graphics processing units (GPUs), network adapters, central processing units and network devices such as switch (e.g., a high-speed direct GPU-to-GPU interconnect such as the NVIDIA GH100 NVLINK or the NVIDIA Quantum 2 64 Ports InfiniBand NDR Switch).

In at least one embodiment, computer system 500 may include, without limitation, processor 502 that may include, without limitation, one or more execution units 507 that may be configured to execute a Compute Unified Device Architecture ("CUDA") (CUDA® is developed by NVIDIA Corporation of Santa Clara, Calif.) program. In at least one embodiment, a CUDA program is at least a portion of a software application written in a CUDA programming language. In at least one embodiment, computer system 500 is a single processor desktop or server system. In at least one embodiment, computer system 500 may be a multiprocessor system. In at least one embodiment, processor 502 may include, without limitation, a CISC microprocessor, a RISC microprocessor, a VLIW microprocessor, a processor implementing a combination of instruction sets, or any other processor device, such as a digital signal processor, for example. In at least one embodiment, processor 502 may be coupled to a processor bus 510 that may transmit data signals between processor 502 and other components in computer system 500.

In at least one embodiment, processor 502 may include, without limitation, a Level 1 ("L1") internal cache memory ("cache") 504. In at least one embodiment, processor 502 may have a single internal cache or multiple levels of internal cache. In at least one embodiment, cache memory may reside external to processor 502. In at least one embodiment, processor 502 may also include a combination of both internal and external caches. In at least one embodiment, a register file 506 may store different types of data in various registers including, without limitation, integer registers, floating point registers, status registers, and instruction pointer register.

In at least one embodiment, execution unit 507, including, without limitation, logic to perform integer and floating point operations, also resides in processor 502. Processor 502 may also include a microcode ("ucode") read only memory ("ROM") that stores microcode for certain macro instructions. In at least one embodiment, execution unit 502 may include logic to handle a packed instruction set 509. In at least one embodiment, by including packed instruction set 509 in an instruction set of a general-purpose processor 502, along with associated circuitry to execute instructions, operations used by many multimedia applications may be performed using packed data in a general-purpose processor 502. In at least one embodiment, many multimedia applications may be accelerated and executed more efficiently by using full width of a processor's data bus for performing operations on packed data, which may eliminate a need to transfer smaller units of data across a processor's data bus to perform one or more operations one data element at a time.

In at least one embodiment, an execution unit may also be used in microcontrollers, embedded processors, graphics devices, DSPs, and other types of logic circuits. In at least one embodiment, computer system 500 may include, without limitation, a memory 520. In at least one embodiment, memory 520 may be implemented as a DRAM device, an SRAM device, flash memory device, or other memory device. Memory 520 may store instruction(s) 519 and/or data 521 represented by data signals that may be executed by processor 502.

In at least one embodiment, a system logic chip may be coupled to processor bus 510 and memory 520. In at least one embodiment, the system logic chip may include, without limitation, a memory controller hub ("MCH") 516, and processor 502 may communicate with MCH 516 via processor bus 510. In at least one embodiment, MCH 516 may provide a high bandwidth memory path 518 to memory 520 for instruction and data storage and for storage of graphics commands, data and textures. In at least one embodiment, MCH 516 may direct data signals between processor 502, memory 520, and other components in computer system 500 and to bridge data signals between processor bus 510, memory 520, and a system I/O 522. In at least one embodiment, system logic chip may provide a graphics port for coupling to a graphics controller. In at least one embodiment, MCH 516 may be coupled to memory 520 through high bandwidth memory path 518 and graphics/video card 512 may be coupled to MCH 516 through an Accelerated Graphics Port ("AGP") interconnect 514.

In at least one embodiment, computer system 500 may use system I/O 522 that is a proprietary hub interface bus to couple MCH 516 to I/O controller hub ("ICH") 530. In at least one embodiment, ICH 530 may provide direct connections to some I/O devices via a local I/O bus. In at least one embodiment, local I/O bus may include, without limitation, a high-speed I/O bus for connecting peripherals to memory 520, a chipset, and processor 502. Examples may include, without limitation, an audio controller 529, a firmware hub ("flash BIOS") 528, a wireless transceiver 526, a data storage 524, a legacy I/O controller 523 containing a user input interface 525 and a keyboard interface, a serial expansion port 527, such as a USB, and a network controller 534. Data storage 524 may comprise a hard disk drive, a floppy disk drive, a CD-ROM device, a flash memory device, or other mass storage device. In an embodiment, the wireless transceiver 526 includes a constrained FFE 508.

In at least one embodiment, FIG. 5 illustrates a system, which includes interconnected hardware devices or "chips" (e.g., first device 104-a and second device 104-b as described with reference to FIG. 1) In at least one embodiment, FIG. 5 may illustrate an exemplary SoC. In at least one embodiment, devices illustrated in FIG. 5 may be interconnected with proprietary interconnects, standardized interconnects (e.g., PCIe), or some combination thereof and utilize a GRS link 106 as described with reference to FIG. 1. In at least one embodiment, one or more components of system 500 are interconnected using compute express link ("CXL") interconnects.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more of individual non-transitory storage media of multiple non-transitory computer-readable storage media lack all of the code while multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as the system may embody one or more methods and methods may be considered a system.

In the present document, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or inter-process communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A system comprising:
   a first device coupled with a link and comprising a transmitter, the first device to: transmit one or more request frames for synchronization of a data layer each request frame comprising a quantity of bits and an error code; and
   a second device coupled with the link and comprising a receiver and the data layer, the second device to:
   receive a first set of bits, the first set of bits corresponding to the quantity of bits in each request frame of the one or more request frames;
   perform an error decode operation on the first set of bits received using a first portion of the first set of bits;
   determine the first set of bits corresponds to a frame boundary of the one or more request frames responsive to a success of the error decode operation; and
   transmit an acknowledgement of the synchronization of the data layer based at least in part on determining the first set of bits corresponds to the frame boundary.

2. The system of claim 1, wherein the first device further comprises a receiver, the first device is further to:
   receive the acknowledgement of the synchronization; and
   refrain from transmitting the request for synchronization based on receiving the acknowledgment.

3. The system of claim 2, wherein the first device is further to:
   transmit a synchronization done frame indicating a completion of the synchronization of the data layer to the second device based on receiving the acknowledgment; and
   transmit data from the first device to the second device based at least in part on transmitting the synchronization done frame.

4. The system of claim 1, wherein to perform the error decode operation the first device is further to:
   generate a second error code for the first set of bits based on receiving the first set of bits; and
   comparing the second error code with the first portion of the first set of bits, wherein determining the first set of bits correspond to the frame boundary of the one or more request frames is based at least in part on the comparison.

5. The system of claim 4, wherein the portion of the first set of bits corresponds to the error code of each request frame.

6. The system of claim 1, wherein:
   the second device further comprises a transmitter, the second device to:
   transmit a second set of one or more request frames for synchronization of a second data layer, each request frame comprising a second quantity of bits and a second error code; and
   the first device further comprises a receiver, the first device to:
   receive a second set of bits, the second set of bits corresponding to the second quantity of bits in each request frame of the second set of one or more request frames;

perform a second error decode operation on the second set of bits received using a second portion of the second set of bits;

determine the second set of bits correspond to a second frame boundary of the second set of one or more request frames responsive to a success of the error decode operation; and transmit a second acknowledgement of the synchronization of the second data layer based at least in part on determining the second set of bits corresponds to the second frame boundary.

7. The system of claim 6, wherein the second set of one or more request frames is transmitted simultaneously with the one or more request frames.

8. The system of claim 7, wherein one or more request frames are transmitted during a first duration and the second set of one or more request frames is transmitted during a second duration, the first duration different than the second duration.

9. A method comprising:

receiving, by a first device, a first set of bits, wherein a quantity of bits of the first set of bits corresponds to a frame size;

performing, at the first device, an error decode operation on the first set of bits using a portion of the first set of bits;

determining that the first set of bits corresponds to a frame boundary of a frame responsive to a success of the error decode operation; and sending an acknowledgement of a synchronization of a data layer based at least in part on determining that the first set of bits corresponds to the frame boundary.

10. The method of claim 9, wherein prior to determining the first set of bits corresponds to the frame boundary, the method further comprises:

receiving a second set of bits, wherein a second quantity of bits of the second set of bits corresponds to the frame size and, wherein at least some bits are common to the first set of bits and the second set of bits;

performing the error decode operation on the second set of bits using a portion of the second set of bits; and determining that the second set of bits does not correspond to the frame boundary responsive to a failure of the error decode operation.

11. The method of claim 10, further comprising:

receiving a third set of bits subsequent to receiving the second set of bits, wherein the third set of bits comprise a third quantity of bits less than the quantity of bits corresponding to the frame size; and refraining from performing the error decode operation on the third set of bits based on the failure of the error decode operation, wherein the first set of bits is received after receiving the third set of bits.

12. The method of claim 11, wherein the third set of bits is received during one clock cycle of a second device.

13. The method of claim 11, wherein the second set of bits is received during two or more clock cycles of a second device.

14. The method of claim 9, wherein to perform the error decode operation further comprises:

generating an error code associated with the first set of bits based at least in part on receiving the first set of bits; and comparing the error code with the portion of the first set of bits.

15. The method of claim 14, wherein determining the first set of bits corresponds to the frame boundary of the frame further comprises:

determining the error code matches the portion of the first set of bits.

16. A device comprising:

a receiver coupled with a link, the receiver to:

receive a first set of bits, wherein a quantity of bits of the first set of bits corresponds to a frame size; and a controller coupled with the receiver, the controller to:

perform an error decode operation on the first set of bits using a portion of the first set of bits;

determine that the first set of bits corresponds to a frame boundary of a frame responsive to a success of the error decode operation; and generate an acknowledgement of a synchronization of a data layer based at least in part on determining that the first set of bits corresponds to the frame boundary.

17. The device of claim 16, further comprising:

a transmitter coupled with the link, the transmitter to:

transmit the acknowledgement of the synchronization of the data layer to a second device.

18. The device of claim 16, wherein the receiver is further to:

receive a synchronization done frame indicating a completion of the synchronization of the data layer based at least in part on a second device transmitting the acknowledgment.

19. The device of claim 16, wherein:

the receiver is further to:

receive a second set of bits, wherein a second quantity of bits of the second set of bits corresponds to the frame size and, wherein at least some bits are common to the first set of bits and the second set of bits; and the controller is further to:

perform the error decode operation on the second set of bits using a portion of the second set of bits; and determine that the second set of bits does not correspond to the frame boundary responsive to a failure of the error decode operation.

20. The device of claim 16, wherein:

the receiver further to:

receive a third set of bits subsequent to receiving the second set of bits, wherein the third set of bits comprise a third quantity of bits less than the quantity of bits corresponding to the frame size; and the controller further to:

refrain from performing the error decode operation on the third set of bits based on the failure of the error decode operation, wherein the first set of bits is received after receiving the third set of bits.

* * * * *